United States Patent
Ponnuswamy

(10) Patent No.: US 10,193,742 B2
(45) Date of Patent: Jan. 29, 2019

(54) SELECTING A CORRECTIVE ACTION FOR A NETWORK CONNECTION PROBLEM BASED ON HISTORICAL DATA

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

( * ) Notice: Subject to any disclaimer, the term of this patent is extended or adjusted under 35 U.S.C. 154(b) by 401 days.

(21) Appl. No.: 14/926,778

(22) Filed: Oct. 29, 2015

(65) Prior Publication Data
US 2017/0126477 A1  May 4, 2017

(51) Int. Cl.
| | |
|---|---|
| G06F 15/16 | (2006.01) |
| H04L 12/24 | (2006.01) |
| H04L 12/26 | (2006.01) |
| H04L 29/12 | (2006.01) |
| H04L 29/14 | (2006.01) |
| H04W 12/06 | (2009.01) |
| H04W 88/08 | (2009.01) |

(52) U.S. Cl.
CPC .......... *H04L 41/0654* (2013.01); *H04L 29/14* (2013.01); *H04L 41/06* (2013.01); *H04L 41/0631* (2013.01); *H04L 43/0811* (2013.01); *H04L 61/2015* (2013.01); *H04L 69/40* (2013.01); *H04W 12/06* (2013.01); *H04W 88/08* (2013.01)

(58) Field of Classification Search
CPC ...... H04L 29/14; H04L 41/06–41/0889; H04L 69/40
See application file for complete search history.

(56) References Cited

U.S. PATENT DOCUMENTS

| | | | | |
|---|---|---|---|---|
| 5,666,481 | A * | 9/1997 | Lewis | G06F 11/2257 714/15 |
| 6,877,104 | B1 * | 4/2005 | Shimono | H04W 24/04 370/216 |
| 7,016,948 | B1 * | 3/2006 | Yildiz | H04L 43/18 709/221 |
| 2002/0198881 | A1 * | 12/2002 | Banerjee | H04L 29/12 |

(Continued)

OTHER PUBLICATIONS

"Troubleshoot 11n Speeds", https://www.cisco.com/c/en/us/support/docs/wireless-mobility/wireless-lan-wlan/112055-tshoot-11n-speeds-00.pdf. Aug. 18, 2010.*

(Continued)

*Primary Examiner* — Brendan Y Higa
(74) *Attorney, Agent, or Firm* — Invoke

(57) ABSTRACT

A system and method of selecting a corrective action for a network connection problem based on historical data is disclosed. A first network connection problem in a current environment associated with a set of one or more conditions is identified. A second network connection problem, with the same set of one or more conditions as the first network connection problem, is determined as being previously corrected by an application of a particular corrective action. Responsive at least to the determination, the particular corrective action is selected from a plurality of corrective actions for application to the first network connection problem. The particular corrective action is applied to correct the first network connection problem.

23 Claims, 4 Drawing Sheets

(56) References Cited

U.S. PATENT DOCUMENTS

| | | | | |
|---|---|---|---|---|
| 2004/0049714 | A1* | 3/2004 | Marples | H04L 12/2803 714/43 |
| 2004/0261116 | A1* | 12/2004 | Mckeown | H04L 12/2801 725/109 |
| 2006/0215581 | A1* | 9/2006 | Castagnoli | H04L 41/0663 370/254 |
| 2006/0233114 | A1* | 10/2006 | Alam | H04L 41/069 370/252 |
| 2007/0197206 | A1* | 8/2007 | Olson | H04L 41/06 455/423 |
| 2009/0150724 | A1* | 6/2009 | Pramidi | H04L 41/0631 714/37 |
| 2009/0219822 | A1* | 9/2009 | Variyath | H04L 41/145 370/245 |
| 2011/0317543 | A1* | 12/2011 | Medina | H04L 1/0009 370/216 |
| 2016/0255521 | A1* | 9/2016 | Zhang | H04W 4/008 370/252 |

OTHER PUBLICATIONS

"Changing Wi-Fi Settings in your modem", _CenturyLink_ Nov. 11, 2017 [https://internethelp.centurylink.com/internethelp/wireless-troubles-best-channel-modem.html#].*

"Changing Wi-Fi Settings in your modem", _CenturyLink_ Jul. 7, 2015 Internet Archive [http://web.archive.org/web/20150719011847/https://internethelp.centurylink.com/internethelp/wireless-troubles-best-channel-modem.html].*

* cited by examiner

US 10,193,742 B2

SELECTING A CORRECTIVE ACTION FOR A NETWORK CONNECTION PROBLEM BASED ON HISTORICAL DATA

TECHNICAL FIELD

The present disclosure relates to corrective actions for a wireless environment. In particular, the present disclosure relates to selecting a corrective action for a network connection problem based on historical data.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs communicate with network devices to obtain access to one or more network resources. Network devices, such as access points, are digital devices that may be communicatively coupled to one or more networks (e.g., Internet, an intranet, etc.). Network devices may be directly connected to the one or more networks or connected via a controller. A network device, as referred to herein, may include a wireless Access Point (AP) that communicates wirelessly with devices using Wi-Fi, Bluetooth or related standards and that communicates with a wired network. A network device may provide a wireless coverage area, within which devices may wirelessly connect to a network through the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

A. General Overview

In one or more embodiments, a corrective action for a network connection problem is selected based on historical data. A current network connection problem associated with a set of conditions is identified. A prior network connection problem that is (a) same as the current network connection problem and (b) associated with a same set of conditions is identified. Based on the prior network connection problem being corrected by an application of a particular corrective action, the particular corrective action is selected for application to the current network connection problem.

B. Architectural Overview

Figure 1:
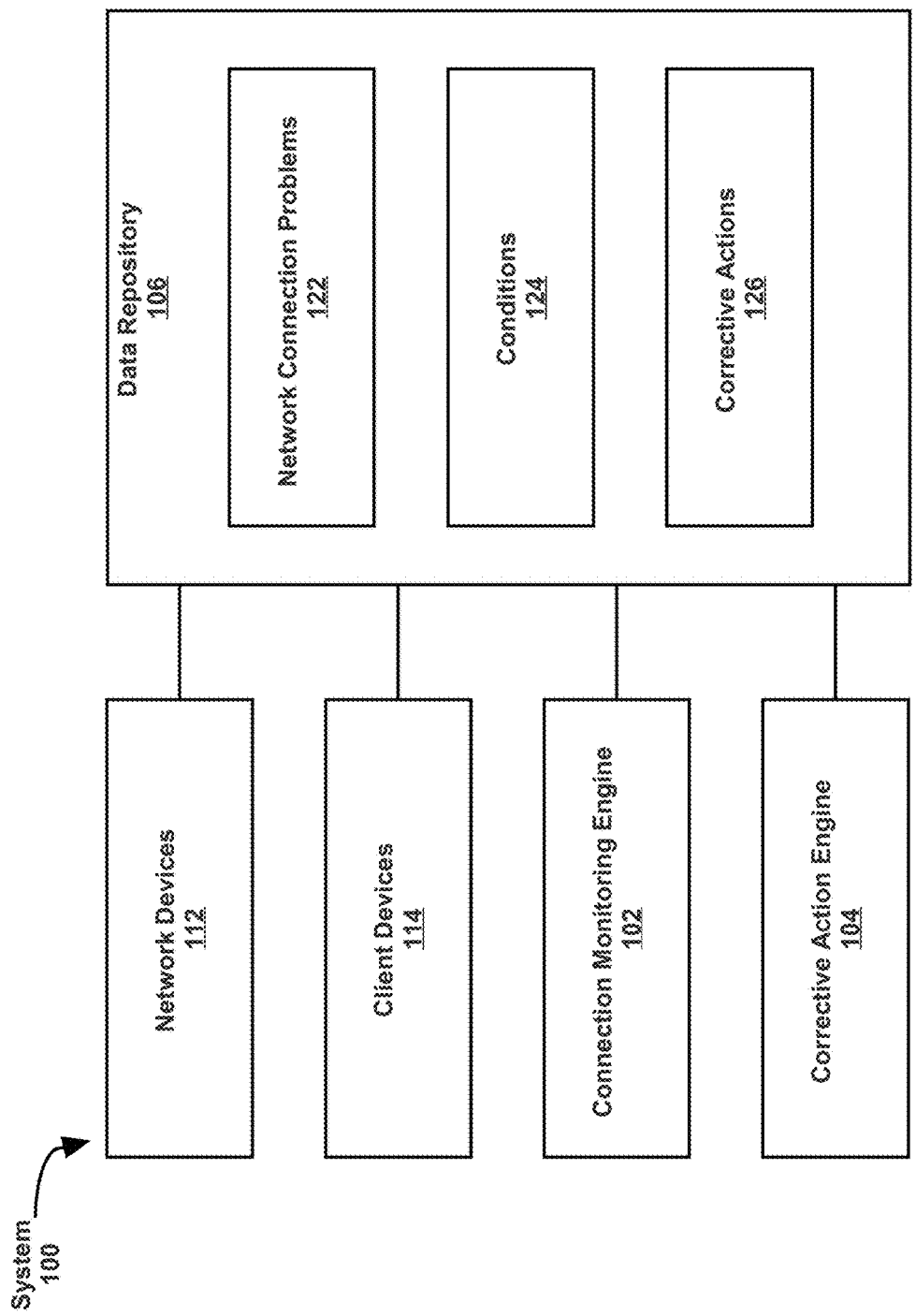
FIG. 1 shows a block diagram example of a system in accordance with one or more embodiments.

FIG. 1 shows a block diagram example of a system in accordance with one or more embodiments. As illustrated in FIG. 1, system 100 includes one or more network devices 112, one or more client devices 114, connection monitoring engine 102, corrective action engine 104, and data repository 106. In one or more embodiments, system 100 may include more or fewer components, than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, network devices 112 are digital devices that facilitate access to one or more network resources by one or more other digital devices (such as client devices 114). The term "digital device" generally refers to any hardware device that includes a processor. A digital device may refer to a physical controller device or a hardware device executing a virtual controller. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, an Access Point (AP), and a wireless access point (WAP).

In an embodiment, network devices 112 include one or more digital devices having functionality to transmit and/or receive information from each other without being connected by an electrical conductor. A digital device having functionality to transmit and/or receive information from each other without being connected by an electrical conductor is referred to herein as a "wireless device." The functionality to wirelessly communicate may be implemented through, for example, an IEEE 802.11 wireless interface. Each of network devices 112 is associated with an identifier (ID).

In one or more embodiment, client devices 114 are digital devices that are configured to connect to one or more network resources through one or more other digital devices (such as network devices 112). Client devices 114 may be configured to receive, through the network resources, web traffic, voice data streams, video data streams, and/or any other type of data. In an example, client devices 114 transmit and/or receive wireless signals based on IEEE 802.11 standards. Each of client devices 114 is associated with an identifier (ID).

In one or more embodiments, data repository 106 is any type of storage unit and/or device (e.g., a file system, database, collection of tables, or any other storage mechanism) for storing data. Further, data repository 106 may include multiple different storage units and/or devices. The multiple different storage units and/or devices may or may not be of the same type or located at the same physical site. Further, data repository 106 may be or may execute on the same computing system as connection monitoring engine 102 and/or corrective action engine 104. Alternatively or additionally, data repository 106 may be on a separate computing system than connection monitoring engine 102 and/or corrective action engine 104. Data repository 106 may be connected to connection monitoring engine 102 and/or corrective action engine 104 via a direct connection or via a network.

Data sets describing one or more network connection problems 122, one or more conditions 124, and one or more corrective actions 126 may be implemented across any of components within system 100. However, these data sets are illustrated within data repository 106 for purposes of clarity and explanation.

In one or more embodiments, network connection problems 122 include issues related to a connection between an access point and a client device. Examples of network connection problems 122 include but are not limited to:
  (a) a client device not being able to connect to an access point,
  (b) a client device not being able to maintain connectivity to an access point,
  (c) a client device not being able to receive wireless signals from an access point at or above a particular signal-to-noise ratio (SNR) threshold or a particular signal strength threshold,
  (d) an access point not being able to receive wireless signals from a client device at or above a particular SNR threshold or a particular signal strength threshold,
  (e) a client device and an access point not being able to exchange data at or above a minimum data rate,
  (f) a client device not able to successfully roam from one access point to another,
  (g) a client device not able to successfully roam from one access point to another within a time threshold, and
  (h) a client device not able to successfully roam from one access point to another neighboring access point with best quality or performance In an embodiment, network connection problems 122 include one or more current network connection problems and one or more historical network connection problems. Historical network connection problems are network connection problems that were previously identified and stored in a database or other memory. Each of network connection problems 122 is associated with one or more conditions 124. A current network connection problem is a problem that is to be solved in accordance with one or more embodiments.

In one or more embodiments, conditions 124 include attributes related to a wireless environment at or around the time that a network connection problem is occurring, being detected, and/or being resolved.

In an embodiment, a condition is a client device being located at a particular location while attempting to initiate and/or maintain a connection with an access point. The particular location of the client device may be specified as a physical location and/or a radio frequency (RF) location.

In an embodiment, a physical location of a client device may be specified in various ways, such as using coordinates in a coordinate system (for example, longitudinal and latitudinal coordinates, or (x, y, z) coordinates), an address, a position relative to a building (for example, a wing, floor, or room of a building), or a position relative to another object.

In an embodiment, a physical location of a client device may be entered by a user or detected by a system (for example, a Global Positioning System (GPS)). Alternatively, a physical location of a client device may be computed or estimated based on other data. In an example, a client device transmits a wireless signal at 30 dBm, and an access point detects the wireless signal at −40 dBm. A path loss model for the environment is known. Applying 30 dBm and −40 dBm to the pass loss model, the distance between the client device and the network device may be estimated.

In an embodiment, a RF location of a client device is specified based on how well the client device may communicate with other wireless devices. A RF location of a particular wireless device identifies one or more other wireless devices that may receive wireless signals transmitted by the particular wireless device, and specifies the signal strength at which the wireless signals are received. Additionally or alternatively, a RF location of a particular wireless device identifies one or more wireless devices transmitting wireless signals that may be received by the particular wireless device, and specifies the signal strength at which the wireless signals are received.

In an embodiment, a RF location of a client device is specified relative to one or more RF neighborhoods. A RF neighborhood refers to (a) a set of wireless devices that satisfy one or more criteria (as specified below), or (b) a geographical space that is within a RF communication range from at least one of the set of wireless devices. The set of wireless devices satisfy one or more criteria related to the RF communications range of the wireless devices, such as:
  (a) each of the set of wireless devices is within a RF communications range from a particular wireless device;
  (b) each of the set of wireless devices is within a particular number of hops from a particular wireless device;
  (c) each of the set of wireless devices is within a RF communications range from all other wireless devices in the set of wireless devices; or
  (d) each of the set of wireless devices is within a RF communications range from at least one other wireless device in the set of wireless device.

In an embodiment, a first device is within a RF communication range (referred to herein as "reachable") of a second device when a wireless signal transmitted by the second device at a certain transmit power is received by the first device at or above a signal strength threshold. The transmit power and signal strength thresholds may be configured statically or learned dynamically in any system.

In an embodiment, a number of hops corresponds to a number of intermediary devices necessary for wireless communication between two devices. In an example, if a first device is within a RF communication range of a second device, zero intermediary devices are needed. If a first device and second device are not within a RF communication range of each other, but each is within a RF communication range of a third device, then the first device and second device are reachable via one intermediary device. A RF neighborhood may be defined by a set of wireless devices that are reachable from a particular wireless device via a particular number of intermediary devices.

In an embodiment, a physical environment may be partitioned into multiple RF neighborhoods that are each isolated from other RF neighborhoods. A RF neighborhood is isolated if the RF neighborhood is not reachable by at least one wireless device in another RF neighborhood. In another embodiment, a physical environment may be partitioned into multiple RF neighborhoods that overlap with each other. One wireless device may be associated with one or more RF neighborhoods.

In an embodiment, a condition is a client device and an access point exchanging data using a particular Modulation and Coding Scheme (MCS) and/or Physical Layer (PHY) rate. A MCS index and/or PHY rate affects a data rate of a wireless connection between two or more wireless devices. A wireless signal transmitted at a particular data rate needs to reach a wireless device at or above a particular signal strength threshold in order to be received and decoded by the wireless device.

In an embodiment, a condition is a client device using a particular frame aggregation size for aggregating packets for transmission to an access point. Alternatively or additionally, a condition is an access point using a particular frame aggregation size for aggregating packets for transmission to a client device. Two or more data frames may be aggregated in a single transmission.

In an embodiment, a condition is a client device and an access point exchanging data using a particular radio frequency (RF) channel. A RF channel is a particular range of frequencies. A RF channel may be, for example, one of the fourteen channels in the IEEE 802.11 2.4 GHz band.

In an embodiment, a condition is a particular channel utilization of a particular channel. Channel utilization refers to a percentage of time in which the particular channel is being used. The particular channel may be used by wireless signals transmitted and/or received by one or more wireless devices.

In an embodiment, the above is a non-exhaustive list of example conditions 124. Other conditions 124 may include a level of interference, identifiers of wireless devices involved in a network connection or attempted network connection, a particular time period in which a network connection is initiated, maintained, and/or attempted (for example, a time of day, or a day of the week), and the type of data that is being or is to be transmitted (for example, voice, video, and/or other data).

In an embodiment, conditions 124 are associated with network connection problems 122. A condition is associated with a network connection problem if the condition existed at the time the network connection problem is occurring, is detected, and/or is being resolved. Each historical network connection problem, associated with particular historical conditions, is further associated with one or more corrective actions 126.

In one or more embodiments, corrective actions 126 include actions that may be performed to correct, improve, or change a network connection problem. Examples of corrective actions 126 include but are not limited to:

(a) terminating a wireless connection between a client device and an access point,
(b) resetting a wireless connection between a client device and an access point,
(c) forcing a client device to switch from associating with a first access point to associating with a second access point,
(d) modifying one or more wireless configurations of a network device, and
(e) modifying one or more wireless configurations for a client device.

In an embodiment, examples of resetting a wireless connection between a client device and an access point includes resetting an initial state of the wireless connection and/or resetting an intermediate state of the wireless connection. Example operations for resetting a wireless connection are described below with reference to Operation 234 of FIG. 2.

In an embodiment, wireless configurations of a network device include but are not limited to a transmit power, a MCS or PHY rate, a receive sensitivity, a receive gain, a transmit cell size, a receive cell size, and a RF channel.

In an embodiment, wireless configurations of a client device include but are not limited to a transmit power, a MCS or PHY rate, a retry rate, and an aggregation size.

In an embodiment, corrective actions are associated with historical network connection problems occurring under particular conditions. A corrective action is associated with a particular network connection problem occurring under particular conditions if the corrective action was previously used or attempted to resolve the particular network connection problem occurring under the particular conditions.

In one or more embodiments, connection monitoring engine 102 refers to hardware and/or software configured to perform operations described herein for monitoring and/or detecting network connection problems 122. Corrective action engine 104 refers to hardware and/or software configured to perform operations described herein for selecting and/or applying corrective actions 126. Connection monitoring engine 102 and/or corrective action engine 104 may be implemented on one or more digital devices. In an example, connection monitoring engine 102 and/or corrective action engine 104 is the same as or implemented on a same device as one or more of network devices 112 and/or client devices 114. In another example, connection monitoring engine 102 and/or corrective action engine 104 is implemented on a separate device from network devices 112 and/or client devices 114, such as at a controller and/or a server located in a cloud computing environment. Examples of operations performed by the connection monitoring engine 102 and/or corrective action engine 104 are described below with references to FIG. 2.

Figure 2:
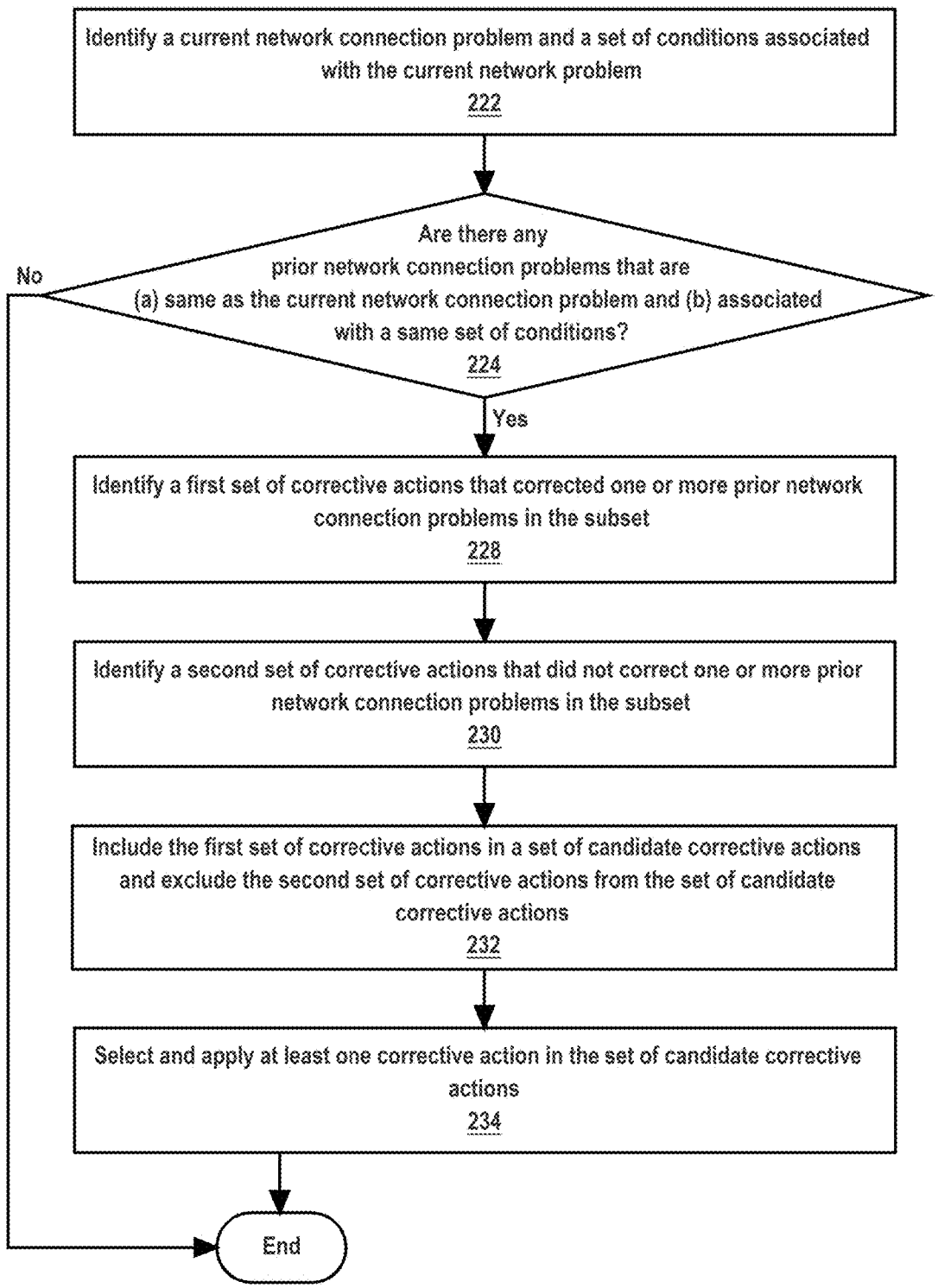
FIG. 2 shows an example set of operations for selecting a corrective action for a network connection problem based on historical data in accordance with one or more embodiments.

C. Selecting a Corrective Action for a Network Connection Problem Based on Historical Data FIG. 2 shows an example set of operations for selecting a corrective action for a network connection problem based on historical data in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, a current network problem and a set of conditions associated with the current network problem are identified (Operation 222). The current network problem and the set of conditions are detected by one or more wireless devices in a wireless environment. The wireless devices may or may not be involved in the current network problem.

In an example, a first access point receives a probe request from a client device having ID 01 and responds with a probe response to initiate the authentication/association process. After a particular time period, an inquiry is made as to whether the client device having ID 01 has successfully established a connection with a network resource provided by the first access point. If no connection is found, then a current network connection problem is detected.

The probe request, sent from the client device having ID 01, was made over a particular RF channel. Further, the first access point received the probe request at a signal strength of −40 dBm, a second access point received the probe request at a signal strength of −50 dBm, and a third access point did not receive the probe request. Based on the signal strength information from the three access points, an RF location of the client device having ID 01 is determined. Conditions identified as being associated with the current network connection problem include: (1) the particular RF channel used by the probe request, (2) the signal strengths received at the first access point, the second access point, and the third access point, and (3) the RF location of the client device.

In an embodiment, the current network connection problem and/or current conditions are associated with confidence levels. A confidence level indicates a likelihood that the current network connection problem and/or condition has been accurately determined. The current network connection problem and/or current conditions are identified if the confidence levels are above a threshold. In an example, a first access point receives a probe request from a client device at a signal strength of −40 dBm, a second access point receives the probe request at a signal strength of −50 dBm, and a third access point does not receive the probe request. Based on the signal strength information from the three access points, a physical location of the client device is estimated. The physical location of the client device is estimated with a particular confidence level. If the particular confidence level is above a threshold, then the physical location of the client device is identified as a current condition.

In one or more embodiments, an inquiry is made as to whether there are any prior network problems that are (a) same as the current network connection problem and (b) associated with a same set of conditions (Operation 224). Prior network connection problems, and conditions associated with each prior network connection problem, were previously detected and stored in a database or other memory. The database or other memory is searched and/or looked up to identify a subset of prior network connection problems that are (a) same as the current network connection problem and (b) associated with a same set of conditions.

In an embodiment, the database is searched and/or looked up to identify prior network connection problems that are the same as the current network connection problem. Then, conditions associated with each identified prior network connection problem are also identified. If the prior conditions of a particular prior network connection problem are the same as or similar to the current conditions, then the particular prior network connection problem is included in the subset of prior network connection problems that are (a) the same as the current network connection problem and (b) associated with a same set of conditions.

In an example, a current network connection problem is that a client device is unable to connect to an access point. Current conditions associated with the current network connection problem include (a) the client device has ID 07, and (b) the client device is using RF channel 1. A search of a database of prior network connection problems and associated conditions is performed. Prior network connection problems where a client device is unable to connect to an access point are identified. For each identified prior network connection problem, associated conditions are also identified. A subset of the identified prior network connection problems that are associated with the conditions, (a) the client device has ID 07, and (b) the client device is using RF channel 1, is identified.

In an embodiment, a prior condition is considered to be "same" as a current condition if the prior condition matches the current condition within a particular range. In an example, a current condition is that a client device is located at a particular location with {x, y, z} coordinates being {12, 34, 56}. A particular range for determining a match between locations is that the locations are within 10 cm apart. A prior condition, associated with a prior network connection problem, is that a client device is located at {13, 36, 54}. An inquiry is made as to whether location {12, 34, 56} and location {13, 36, 54} are within 10 cm apart. If so, then the prior condition is considered to be "same" as the current condition. As another example, a particular range is used for determining a match between time periods. The time periods are considered to be the "same" if the time periods are within the particular range.

In one or more embodiments, if no prior network connection problems are (a) same as the current network connection problem and (b) associated with a same set of conditions, then the process for selecting a corrective action for the current network connection problem based on historical data ends. The current network connection problem is added to the database or other memory storing prior network connection problems. The current network connection problem may be added to the database or other memory by a system and/or application. Alternatively, the current network connection problem may be added to the database or other memory by a user (such as an administrator). The user may review the description of the current network connection problem and create a new entry for the current network connection problem in the database via a user interface. Corrective actions that are attempted for the current network connection problem, as well as whether the corrective actions failed or succeeded, are also recorded in the database. Hence, the database grows to include new information on network connection problems and/or corrective actions, which may be used in resolving future network connection problems.

In one or more embodiments, if a subset of one or more prior network connection problems are (a) same as the current network connection problem and (b) associated with a same set of conditions, then a first set of corrective actions that corrected one or more prior network connection problems in the subset is identified (Operation 228).

In an embodiment, corrective actions that corrected a particular prior network connection problem associated with particular conditions were previously stored in a database or other memory. Subsequently, a current network connection problem and a set of conditions associated with the current network connection problem are identified. The particular prior network connection problem is included in a subset of prior network connection problems that are (a) same as the current network connection problem and (b) associated with a same set of conditions. Then the corrective actions that corrected the particular prior network connection problem are retrieved from the database or other memory.

In an example, a client device is unable to maintain a connectivity level with an access point. At the time of this network connection problem, a condition is that the client device is located at a particular location with {x, y, z} coordinates being {12, 34, 56}. A corrective action, increasing the transmit power of the access point, is performed. After the corrective action is performed, the client device is able to maintain a connectivity level with the access point. The corrective action is stored in a database and may be subsequently retrieved as a corrective action that previously corrected the network connection problem (a client device is unable to maintain a connectivity level with an access point) with the associated conditions (the client device is located at {12, 34, 56}).

In an embodiment, a confidence level associated with each corrective action, in successfully correcting the prior network connection problem, is identified. Each time a corrective action is attempted, a determination is made as to whether the network connection problem has been resolved. The determination is made with a particular confidence level. Corrective actions that corrected a prior network connection problem with a confidence level above a threshold are included in the first set of corrective actions.

In an example, a network connection problem is that the data rate experienced by a client device is 28.9 Mbit/s, which is below the expected value of 86.7 Mbit/s. After applying a particular corrective action, the data rate experienced by the client device continues to be monitored. The date rate experienced by the client device fluctuates between 65 Mbit/s and 72.2 Mbit/s. Based on the range of data rates experienced by the client device, the particular corrective action is determined to have corrected the network connection problem with a confidence level of 80%. A confidence level of 80% is above a threshold for identifying the particular corrective action as a corrective action that corrected the network connection problem. Hence, the particular corrective action is included in the first set of corrective actions.

In an embodiment, a success rate of each corrective action, in the first set of corrective actions, is identified. Each time a corrective action is attempted, the corrective action is stored as being either successful or unsuccessful in resolving the network connection problem. A success rate of the corrective action is the number of times that the corrective action successfully corrected the particular prior network connection problem having the particular conditions, divided by the number of times that the corrective action was attempted for the particular prior network connection problem having the particular conditions. A success rate of a particular corrective action may be subsequently used in determining whether to apply the corrective action to resolve the current network connection problem.

In an embodiment, multiple success rates are determined for a same corrective action. A first success rate for a particular corrective action, applied to network connection problems associated with a first set of attributes, is determined. A second success rate for the particular corrective action, applied to network connection problems associated with a second set of attributes, is also determined. Attributes associated with network connection problems include but are not limited to the identity of network device(s) and/or client device(s) involved, the location of network device(s) and/or client device(s) involved, the RF channel being used, the load and/or channel utilization, and the time of day at which the network connection problems occur.

In an embodiment, other attributes associated with the first set of corrective actions are identified and may be subsequently used in determining whether to apply a particular corrective action to resolve the current network connection problem. Example attributes include an amount of time used by each corrective action to correct the prior network connection problem is also identified, a number of network devices involved in implementing each corrective action, and a user preference associated with each corrective action.

In one or more embodiments, a second set of corrective actions that did not correct one or more prior network connection problems in the subset is optionally identified (Operation 230). In an embodiment, corrective actions that were attempted but did not correct a particular prior network connection problem associated with particular conditions were previously stored in a database or other memory. The corrective actions that did not correct the particular prior network connection problem are subsequently retrieved from the database or other memory.

In one or more embodiments, the first set of corrective actions is included in a set of candidate corrective actions and the second set of corrective actions is excluded from the set of candidate corrective actions (Operation 232). The set of candidate corrective actions include potential corrective actions that will resolve the current network connection problem having the associated set of conditions.

In an embodiment, a particular corrective action is included in both the first set of corrective actions and the second set of corrective actions. A success rate and/or another attribute associated with the particular corrective action is identified. Based on the attribute associated with the particular corrective action, the particular corrective action is included in or excluded from the set of candidate corrective actions. In an example, a particular corrective action is included in both the first set of corrective actions and the second set of corrective actions. A criteria for determining whether to include the particular corrective action in a set of candidate corrective actions is based on the success rate of the particular corrective action. If the success rate is above a threshold of 50%, then the particular corrective action is included in the set of candidate corrective actions.

In an embodiment, the set of candidate corrective actions includes corrective actions that are not in the first set of corrective actions. In an example, an administrator specifies that a particular corrective action is likely to be successful in correcting a particular network connection problem. The particular corrective action has not been previously attempted for correcting the particular network connection problem. Thus, the particular corrective action is not included in the first set of corrective actions (and is also not included in the second set of corrective actions). Based on the administrator's specification that the particular corrective action is likely to be successful in correcting the particular network connection problem, the particular corrective action is included in the set of candidate corrective actions for a current network connection problem that is the same as the particular network connection problem.

In one or more embodiments, at least one corrective action in the set of candidate corrective actions is selected and applied (Operation 234). In an embodiment, a success rate and/or another attribute associated with each corrective action, in the set of candidate corrective actions, is identified. The set of candidate corrective actions is ranked or ordered based on one or more attributes. The first corrective action in the ordered set of candidate corrective actions is first selected and applied. If the first corrective action is not successful, then the second corrective action in the ordered set of candidate corrective actions may be selected and applied. The set of candidate corrective actions may be thus traversed and applied until the current network connection problem is corrected. Alternatively, the system may decide to apply only a subset of corrective actions based on confidence levels and previous success rates.

In an embodiment, if all corrective actions in the set of candidate corrective actions are attempted and fail to correct the current network connection problem, then an error message is generated, which may be stored in a database or presented to a user via a user interface. The error message may specify each corrective action that was attempted and failed and the details of the failures.

In an example, a set of candidate corrective actions for a current network connection problem associated with a particular set of conditions include:

Corrective Action X: Resetting a wireless connection state between a client device and an access point, and Corrective Action Y: Decreasing a MCS index used for exchanging wireless signals between the client device and the access point.

A success rate of Corrective Action X for correcting a subset of prior network connection problems that are (a) same as the current network connection problem and (b) associated with a same set of conditions is 70%. A success rate of Corrective Action Y for correcting the subset of prior network connection problems that are (a) same as the current network connection problem and (b) associated with a same set of conditions is 80%.

Since Corrective Action Y has a higher success rate than Corrective Action X, Corrective Action Y is first selected and applied. The MCS index used for exchanging wireless signals between the client device and the access point is decreased. However, after the MCS index is decreased, the current network connection problem is not corrected. Then, Corrective Action X is selected and applied. The wireless connection between the client device and the access point is reset. The current network connection problem is then corrected.

In an embodiment, a corrective action includes resetting a wireless connection between a client device and an access point. Examples of resetting a wireless connection between a client device and an access point includes resetting an initial state of the wireless connection and/or resetting an intermediate state of the wireless connection.

In an embodiment, examples of resetting an initial state of the wireless connection includes resetting an IEEE 802.11 association state between the client device and an access point, resetting an 802.1x state between the client device and an authentication server, and resetting a Dynamic Host Configuration Protocol (DHCP) state between the client device and a DHCP server.

In an embodiment, resetting an IEEE 802.11 authentication state includes re-authenticating and/or re-associating a client device. First, a client device transmits a probe request to discover access points within the client device's proximity. The probe request advertises the client device's supported data rates and capabilities. An access point that receives the probe request and is associated with a compatible data rate transmits a probe response to the client device. The client device then transmits an authentication request to the access point. The authentication request may include a shared key, such as a Wired Equivalent Privacy (WEP) key, a Wi-Fi Protected Access (WPA) key, or a Wi-Fi Protected Access 2 (WPA2) key. The access point transmits an authentication response to the client device. At this point, the client device is authenticated but not yet associated. The client device then transmits an association request to the access point. If association is successful, the access point transmits an association response to the client device. The association response includes a status code indicating successful association. If the association is not successful, the access point transmits a status code indicating unsuccessful association. The client device is authenticated and associated to the access point.

In an embodiment, resetting an IEEE 802.1x state includes implementing a port-based network access control. First, when an access point detects a client device that is not yet connected to a network, the access point enables a port for the client device and sets the port to an "unauthorized" state. Then the access point transmits a request for a client device to identify itself. The request may be included in one or more Extensible Authentication Protocol (EAP) Request Identity frames. A client device then transmits its identity to the access point. The identity may be included in one or more EAP-Response Identity frames. The access point then forwards the client device's identity to an authentication server, such as a RADIUS server. The message from the access point to the authentication server may be included in one or more RADIUS Access-Request frames. The authentication server then requests the credentials of the client device to verify the identity of the client device. As part of the request, the authentication server specifies the type of credentials that are required. The client device then transmits its credentials. If the credentials are valid, the authentication server transmits a status code indicating successful authentication, such as an EAP-Success message. Otherwise the authentication transmits a status code indicating unsuccessful authentication, such as an EAP-Failure message. If authentication is successful, then the access point sets the port to an "authorized" state and normal traffic is allowed between the client device and the network.

In an embodiment, resetting a DHCP state re-assigns an IP address to the client device. First, a client device sends a broadcast request, such as a DISCOVER request, to search for a DHCP server. Based on availability and usage policies, the DHCP server determines an appropriate IP address (if any) to assign to the client device. The DHCP server then temporarily reserves the particular IP address for the client device and sends back to the client device an OFFER packet, with the particular IP address. The client device transmits a REQUEST packet, indicating that the client device intends to use the particular IP address. The DHCP server sends an ACK packet, confirming that the client device has been given the particular IP address for a server-specified period of time.

In an embodiment, examples of resetting an intermediate state of the wireless connection includes resetting the IEEE 802.11 power-save state between the client device and an access point, and resetting the IEEE 802.11 aggregation state between the client device and an access point. In power-save state, the client device and the access point are synchronized to perform certain actions at the same time. Resetting the power-save state may involve re-synchronizing the client device and access point. Resetting the aggregation state may involve resetting the number of frames to be aggregated into a single transmission between the client device and the access point.

In an embodiment, the current network connection problem is added to the database or other memory storing prior network connection problems. The current network connection problem may be added to the database or other memory by a system and/or application. Alternatively, the current network connection problem may be added to the database or other memory by a user (such as an administrator). The user may review the description of the current network connection problem and create a new entry for the current network connection problem in the database via a user interface. Corrective actions that are attempted for the current network connection problem, as well as whether the corrective actions failed or succeeded, are also recorded in the database. Hence, the database grows to include new information on network connection problems and/or corrective actions, which may be used in resolving future network connection problems.

In an embodiment, each time that a particular network connection problem occurs is recorded in a database. Based on the number of occurrences of the particular network connection problem, a frequency at which the particular network connection problem occurs may be determined. Further, each time a particular corrective action fails or succeeds to resolve a particular network connection problem is recorded. Based on the number of times that the particular corrective action fails or succeeds, a success rate and/or confidence level that the particular corrective action will resolve the particular network connection problem may be determined.

D. Example Embodiment

Figure 3:
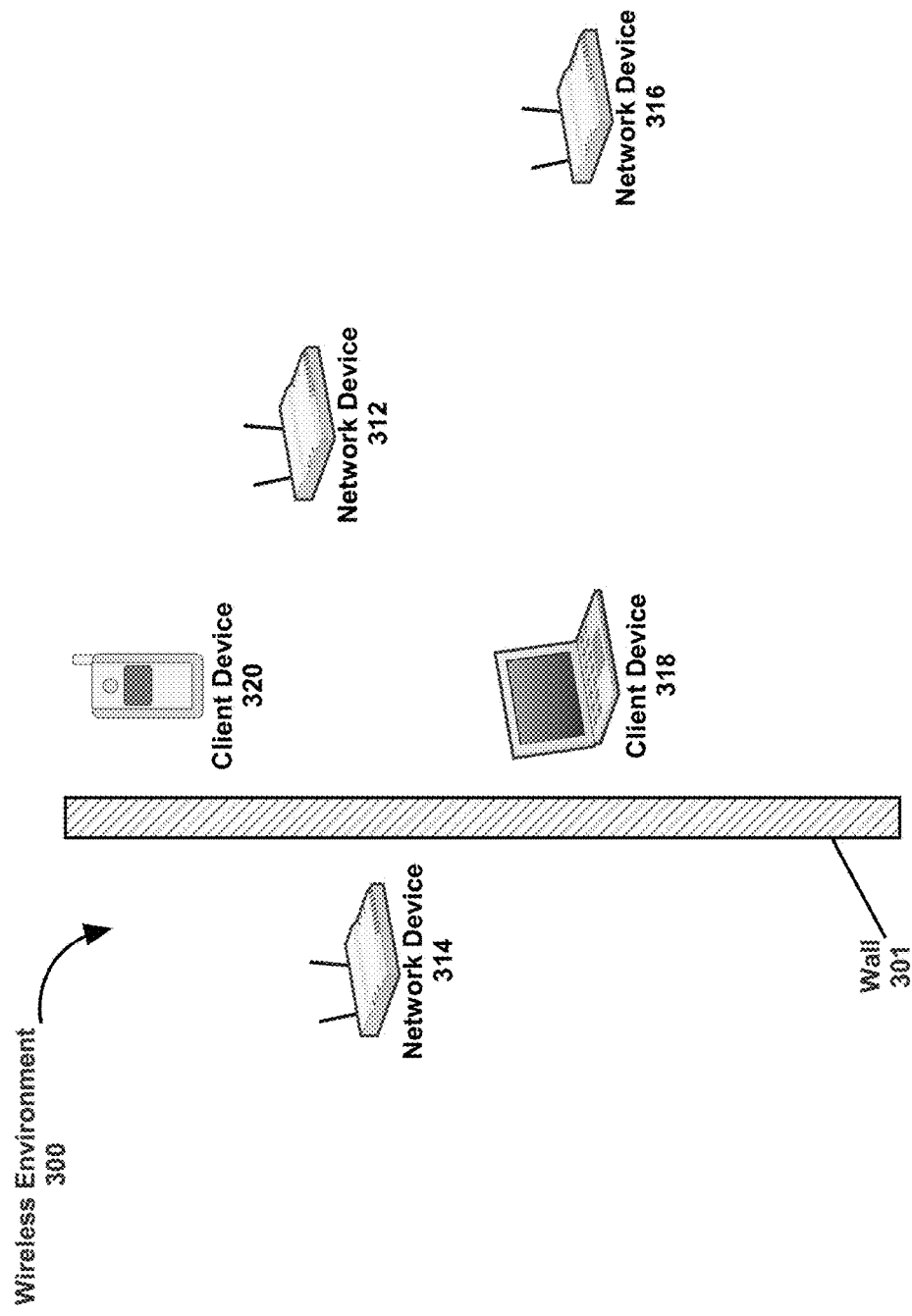
FIG. 3 illustrates an example of selecting a corrective action for a network connection problem based on historical data in accordance with one or more embodiments.

FIG. 3 illustrates an example of selecting a corrective action for a network connection problem based on historical data in accordance with one or more embodiments. Detailed examples are described below for purposes of clarity. Components and/or operations described below should be understood as one specific example which may not be applicable to certain embodiments. Accordingly, components and/or operations described below should not be construed as limiting the scope of any of the claims. Features, components, and/or operations described with regard to this example embodiment are not necessarily applicable to other embodiments.

In an example, a wireless environment 300 includes network devices 312-316, client devices 318-320, and a wall 301. Client devices 318-320 are associated with network device 312, accessing a network resource using network device 312. A high throughput data stream is initiated at client device 320. However, due to interference, the PHY data rate of this connection goes down significantly to occupy most of the airtime. Due to this low data rate connection at client device 320, the latency and jitter for the video stream between client device 318 and network device 312 increases above a threshold. Network device 312 detects the increased delay and jitter. Based on the delay and jitter being above the threshold, a current network connection problem is identified.

Network device 312 receives wireless signals from client device 318 at a signal strength of −50 dBm. Network device 316 receives wireless signals from client device 318 at a signal strength of −80 dBm. Based on the received signal strengths at network devices 312-316 (and/or additional information), a location of client device 318 is estimated to be at a particular location with {x, y, z} coordinates being {12, 34, 56}. Client device 318 being located at {12, 34, 56} is identified as a condition associated with the current network connection problem. In addition, network device 312, having ID 07, being involved in the current network connection problem is also identified as a condition.

A subset of prior network connection problems that are (a) same as the current network connection problem and (b) associated with the same condition is identified. A database storing prior network connection problems, and conditions associated with each prior network connection problem, is searched. Prior network connection problems involving a data rate being below the threshold are identified. An inquiry is made as to whether each identified prior network connection problem is associated with (a) a network device having ID 07, and (b) a client device being located within a particular range of location {12, 34, 56}. If yes, then the prior network connection problem is included in the subset.

A first set of corrective actions that corrected one or more prior network connection problems in the subset is identified. Each corrective action is associated with a preference, which was previously specified by a domain expert or automatically learned based on previous successes. The preference is a number between 1 and 5, with 5 being the most preferred. The first set of corrective actions, and corresponding preferences, is as follows:

Corrective Action X: Resetting a wireless connection between a client device involved in the network connection problem and network device 312, with a preference of 3, and Corrective Action Y: Forcing a client device involved in the network connection problem to switch from associating with network device 312 to associating with network device 316, with a preference of 5.

A second set of corrective actions that did not correct one or more prior connection problems in the subset is identified. The second set of corrective actions is as follows:

Corrective Action Z: Forcing a client device involved in the network connection problem to switch from associating with network device 312 to associating with network device 314.

Corrective Action Z was previously attempted for a prior network connection problem involving a delay and jitter between a client device and a network device above the threshold, wherein the network device had ID 07 and the client device was located within a particular range of {12, 34, 56}. However, Corrective Action Z failed to decrease the delay and jitter experienced by the client device. Specifically, the client device was unable to associate with network device 314 due to the presence of wall 301. Signal strengths of wireless signals were greatly attenuated by wall 301.

The first set of corrective actions is included in a set of candidate corrective actions and the second set of corrective actions is excluded from the set of candidate corrective actions. The set of candidate corrective actions is ordered by preference, with the corrective action having the highest preference being positioned first.

Since Corrective Action Y is associated with the highest preference, Correction Action Y is first selected and applied. An attempt is made to force client device 318 to switch from associating with network device 312 to associating with network device 316. However, network device 316 is experiencing a high level of interference due to external factors. Thus, Corrective Action Y fails to resolve the current network connection problem.

Next, Corrective Action X is selected and applied. The wireless connection between client device 318 and network device 312 is reset. However, the high throughput data stream at client device 320 is still ongoing. The delay and latency for client device 318 is not improved. Thus, Corrective Action X fails to resolve the current network connection problem.

Since there are no other candidate corrective actions, an error message is generated. The error message indicates that the delay and jitter for client device 318 is above the threshold. The error message indicates that Corrective Action X and Corrective Action Y have been attempted. The error message is presented without Corrective Action Z being attempted.

E. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

F. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
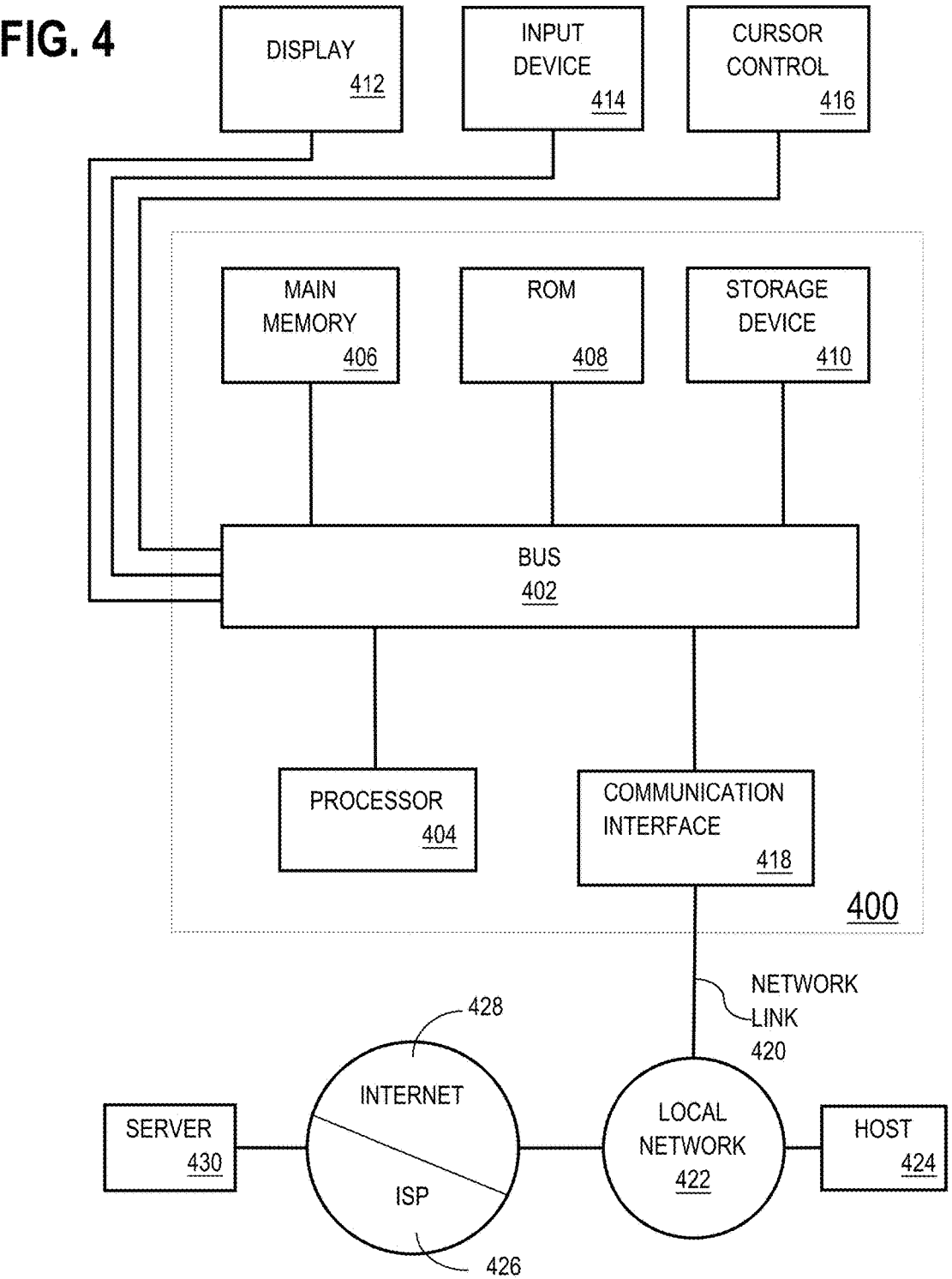
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

identifying a first network connection problem in a current environment associated with a first set of one or more conditions;

determining that a second network connection problem, with a second set of one or more conditions that is within a particular range of the first set of one or more conditions, was corrected by an application of a first corrective action;

determining that a third network connection problem, with a third set of one or more conditions that is within the particular range of the first set of one or more conditions, was corrected by an application of a second corrective action;

determining a first success rate associated with the first corrective action, wherein the first success rate is based on both (a) a number of times that the first corrective action was successful for a set of network connection problems and (b) a number of times that the first corrective action was attempted for the set of network connection problems;

selecting the first corrective action, rather than the second corrective action, for application to the first network connection problem, based on at least the first success rate associated with the first corrective action; and applying the first corrective action to correct the first network connection problem.

2. The medium of claim 1, wherein the operations further comprise:

responsive to determining that the second network connection problem was not corrected by an application of a third corrective action;

selecting the first corrective action, rather than the third corrective action, for application to the first network connection problem.

3. The medium of claim 1, wherein the first network connection problem comprises a client device not being able to connect to an access point.

4. The medium of claim 1, wherein the first network connection problem comprises a client device not being able to maintain a connectivity to an access point.

5. The medium of claim 1, wherein the first network connection problem comprises a client device not being able to receive wireless signals from an access point at (a) a Signal-To-Noise Ratio (SNR) above a first threshold value or (b) a signal strength above a second threshold value.

6. The medium of claim 1, wherein the first network connection problem comprises an access point not being able to receive wireless signals from a client device at (a) a Signal-To-Noise Ratio (SNR) above a first threshold value or (b) a signal strength above a second threshold value.

7. The medium of claim 1, wherein the first network connection problem comprises a client device and an access point not being able to exchange data at or above a minimum expected data rate.

8. The medium of claim 1, wherein the first set of one or more conditions comprises:

a client device being located at a particular location while attempting to transmit data to and/or receive data from a particular access point.

9. The medium of claim 1, wherein the first set of one or more conditions comprises:

a client device communicating with an access point using a particular Modulation and Coding Scheme (MCS).

10. The medium of claim 1, wherein the first set of one or more conditions comprises:

a client device using a particular frame aggregation size for aggregating packets for transmission to an access point.

11. The medium of claim 1, wherein determining that the second network connection problem, with the second set of one or more conditions that is within the particular range of the first set of one or more conditions, was corrected by the application of the first corrective action is based on determining that (a) the first corrective action corrected the second network connection problem with the first confidence level, and (b) the first confidence level is above a particular threshold value.

12. The medium of claim 1, wherein the first corrective action comprises terminating a wireless connection between a client device and an access point.

13. The medium of claim 1, wherein the first corrective action comprises resetting a wireless connection between a client device and an access point.

14. The medium of claim 13, wherein resetting the wireless connection between the client device and the access point comprises:
resetting an IEEE 802.11 association state between the client device and the access point.

15. The medium of claim 13, wherein resetting the wireless connection between the client device and the access point comprises:
resetting an IEEE 802.1x state between the client device and an authentication server.

16. The medium of claim 13, wherein resetting the wireless connection between the client device and the access point comprises:
resetting a Dynamic Host Configuration Protocol (DHCP) state between the client device and a DHCP server.

17. The medium of claim 13, wherein resetting the wireless connection between the client device and the access point comprises:
resetting an IEEE 802.11 power-save state between the client device and the access point.

18. The medium of claim 13, wherein resetting the wireless connection between the client device and the access point comprises:
resetting an IEEE 802.11 aggregation state between the client device and the access point.

19. The medium of claim 1, wherein the first corrective action comprises forcing a client device to switch from associating with a first access point to associating with a second access point.

20. The medium of claim 1, wherein selecting the first corrective action, rather than the second corrective action, for application to the first network connection problem, is further based on a second success rate associated with the second corrective action.

21. The medium of claim 1, wherein selecting the first corrective action, rather than the second corrective action, for application to the first network connection problem, is further based on at least one of: (a) a first confidence level associated with the first corrective action; and (b) a second confidence level associated with the second corrective action.

22. A system comprising:
at least one device including at least one hardware processor;
memory storing instructions which, when executed by the at least one hardware processor, cause performance of operations comprising:
identifying a first network connection problem in a current environment associated with a first set of one or more conditions;
determining that a second network connection problem, with a second set of one or more conditions that is within a particular range of the first set of one or more conditions, was corrected by an application of a first corrective action;
determining that a third network connection problem, with a third set of one or more conditions that is within the particular range of the first set of one or more conditions, was corrected by an application of a second corrective action;
determining a first success rate associated with the first corrective action, wherein the first success rate is based on both (a) a number of times that the first corrective action was successful for a set of network connection problems and (b) a number of times that the first corrective action was attempted for the set of network connection problems;
selecting the first corrective action, rather than the second corrective action, for application to the first network connection problem, based on at least the first success rate associated with the first corrective action; and
applying the first corrective action to correct the first network connection problem.

23. A method comprising:
identifying a first network connection problem in a current environment associated with a first set of one or more conditions;
determining that a second network connection problem, with a second set of one or more conditions that is within a particular range of the first set of one or more conditions, was corrected by an application of a first corrective action;
determining that a third network connection problem, with a third set of one or more conditions that is within the particular range of the first set of one or more conditions, was corrected by an application of a second corrective action;
determining a first success rate associated with the first corrective action, wherein the first success rate is based on both (a) a number of times that the first corrective action was successful for a set of network connection problems and (b) a number of times that the first corrective action was attempted for the set of network connection problems;
selecting the first corrective action, rather than the second corrective action, for application to the first network connection problem, based on at least the first success rate associated with the first corrective action; and
applying the first corrective action to correct the first network connection problem.

* * * * *